United States Patent
Zhou et al.

(10) Patent No.: US 10,041,181 B2
(45) Date of Patent: Aug. 7, 2018

(54) PARALLEL JET ELECTROLYTIC PROCESS AND DEVICE

(71) Applicant: Yanggu Xiangguang Copper CO., Ltd, Shandong (CN)

(72) Inventors: Songlin Zhou, Shandong (CN); Wantao Ning, Shandong (CN); Junjiang Gao, Shandong (CN)

(73) Assignee: Yanggu Xiangguang Copper CO., Ltd, Shandong (CN)

( * ) Notice: Subject to any disclaimer, the term of this patent is extended or adjusted under 35 U.S.C. 154(b) by 129 days.

(21) Appl. No.: 15/014,603

(22) Filed: Feb. 3, 2016

(65) Prior Publication Data
US 2017/0081771 A1    Mar. 23, 2017

(30) Foreign Application Priority Data
Sep. 17, 2015 (CN) .............................. 201510595361

(51) Int. Cl.
*C25C 7/06* (2006.01)
*C25C 1/12* (2006.01)

(52) U.S. Cl.
CPC .................. *C25C 7/06* (2013.01); *C25C 1/12* (2013.01); *Y02P 10/236* (2015.11)

(58) Field of Classification Search
CPC ...................................................... C25C 7/06
See application file for complete search history.

(56) References Cited

U.S. PATENT DOCUMENTS 3,876,516 A * 4/1975 Pace .......................... C25C 1/12
204/237
4,519,878 A * 5/1985 Hara ...................... C25D 3/562
205/141
(Continued)

FOREIGN PATENT DOCUMENTS

CN      103255443 A      8/2013
CN      103334123 A     10/2013
(Continued)

OTHER PUBLICATIONS

Machine Translation of CN104831319A.*
(Continued)

*Primary Examiner* — Bryan D. Ripa
(74) *Attorney, Agent, or Firm* — Swanson & Bratschun, L.L.C.

(57) ABSTRACT

The invention discloses a parallel jet electrolytic process, wherein an electrolyte after being pressurized is jetted in parallel from a position at the bottom and near a surface of a cathode at a rate of 0.5-2.5 m/s into a gap between the cathode and an anode. During the production process, the pressurized electrolyte is jetted in parallel along the surface of the cathode, and the electrolyte flows from bottom to top at the cathode side and moves from top to bottom at the anode side simultaneously, which thus achieves a side cutting function on the cathode and the anode; and the side cutting flow of the electrolyte from top to bottom at the anode is able to greatly increase the settling rate of the anode slime and avoid its adhesion to the anode to form an anode slime layer. The invention also provides a parallel jet electrolytic device.

6 Claims, 5 Drawing Sheets

(56) References Cited

U.S. PATENT DOCUMENTS

| | | | | |
|---|---|---|---|---|
| 2004/0011664 A1* | 1/2004 | Rigby | ...................... | C25C 1/12 |
| | | | | 205/574 |
| 2006/0081478 A1* | 4/2006 | Sahoda | ................... | C25D 5/08 |
| | | | | 205/148 |
| 2008/0035475 A1* | 2/2008 | Gebhart | ................... | C25D 5/08 |
| | | | | 204/273 |
| 2010/0065433 A1* | 3/2010 | Heiremans | ................ | C25C 1/00 |
| | | | | 205/148 |
| 2016/0340789 A1* | 11/2016 | Schwartz | ................ | C25B 1/003 |

FOREIGN PATENT DOCUMENTS

| | | | |
|---|---|---|---|
| CN | 104404575 A | 3/2015 | |
| CN | 104831319 A | 8/2015 | |
| EP | 0342621 A1 | 11/1989 | |
| JP | 7-54182 A | 2/1995 | |

OTHER PUBLICATIONS

Machine Translation of CN104404575A.*
Chinese Office Action from CN 201510595361.X dated Nov. 30, 2016, with English Summary.

* cited by examiner

PARALLEL JET ELECTROLYTIC PROCESS AND DEVICE

RELATED APPLICATIONS

This application claims priority from Chinese Patent Application No. 201510595361.X, filed Sep. 17, 2015, entitled "Parallel Jet Electrolytic Process and Device," which is hereby incorporated by reference.

FIELD OF THE INVENTION

The invention relates to the technical field of nonferrous metal metallurgy, in particular to a parallel jet electrolytic process and a parallel jet electrolytic device.

BACKGROUND OF THE INVENTION

Electrolytic refining process is mainly suitable for the electrolytic refining and purification of metals such as copper, lead, nickel and the like, in which a crude metal serves as an anode, a pure metal serves as a cathode, and a solution containing ions of this metal serves as an electrolyte; the metal dissolves from the anode and precipitates at the cathode. Among the impurities in the crude metal, the inactive ones do not dissolve but become anode slime; since the metal having a higher electrode potential precipitates preferentially at the cathode, and the electrode potential of each metal is determined by the standard electrode potential and the concentration of the metal ions, thus the active ones cannot precipitate at the cathode due to a lower ion concentration thereof, though it dissolve at the anode.

The metal in an electrolytic process follows Faraday's law. Taking copper as an example, its electrolytic precipitation amount may be represented by the following equation:

$$m_{Cu} = n \times 1.1852 \times i \times A \times t \quad (1)$$

in the equation: $m_{Cu}$ is the mass (g) of the precipitated metal, i is the current density (A/m$^2$), t is the time (s), A is the area (m$^2$) of the cathode plate, and n is the number of the electrolytic tank (1).

As can be seen from equation (1), on the premise of the existing process equipments and technologies, the only means to improve the productivity is to increase the current density. However, in the production practice, in case of simply increasing the current density, the metal precipitation at the cathode is accelerated, which tends to cause a decrease in the concentration of the metal ion Cu$^{2+}$ near the cathode, namely, to generate the concentration polarization, thereby resulting in a decreased electrode potential, making the main metal unable to precipitate preferentially on the cathode, leading to the precipitation of the metal impurities and affecting the quality of the products. An increase in current density on the anode induces the anode to dissolve too fast, makes the Cu$^{2+}$ produced from anode dissolution unable to leave the interface between the anode and the solution rapidly to diffuse toward the cathode region, leading to concentration polarization as well. If the Cu$^{2+}$ concentration in the anode region reaches saturation or supersaturation, copper oxides or insoluble salts will be produced and deposited on the anode surface, which will retard the anode reaction, increase the anodic potential, and result in contamination of the electrolyte due to dissolution of a large quantity of the impurity ions into the electrolyte, in severe cases even result in anode passivation, thereby increasing energy consumption.

In addition, as for the anode plate with high impurity comprising a large quantity of impurities such as Pb, As, Sb, Bi, Ni and the like, a relatively thick layer of anode slime will be deposited on the surface of the anode plate during the electrolytic process, and its failure to settle timely will affect the migration and diffusion of Cu$^{2+}$, and in severe cases will result in anode passivation. Consequently, concentration polarization and anode passivation are main factors that cause limitation to the increase in current density in the electrolytic refining process.

Consequently, how to provide an electrolytic process which is capable of eliminating concentration polarization and avoiding occurrence of anode passivation phenomenon becomes a major technical problem that needs to be solved urgently by those skilled in the art.

SUMMARY OF THE INVENTION

In view of this, the invention provides a parallel jet electrolytic process and a parallel jet electrolytic device to achieve an object of eliminating concentration polarization and avoiding anode passivation phenomenon.

To accomplish the above object, the invention provides a technical solution as follows.

It is provided a parallel jet electrolytic process, in which an electrolyte after being pressurized is jetted in parallel from a position at the bottom and near a surface of a cathode at a rate of 0.5 to 2.5 m/s into a gap between the cathode and an anode.

Preferably, the electrolyte is delivered to a pressurization device by a delivery pump and pressurized, and the electrolyte has a pressure of 0.5 to 1 Mpa.

Preferably, the electrolyte is jetted into the gap between the cathode and the anode as two flows, wherein the first flow is jetted in a flat shape parallel to the surface of the cathode, forming a fan-shaped liquid curtain wall close to the surface of the cathode; and the second flow is jetted from the side of the first flow that is far away from the cathode. The electrolyte flows from bottom to top along the surface of the cathode at the cathode side, and moves from top to bottom along a surface of the anode at the anode side simultaneously, forming an inner circulation.

Preferably, the electrolyte is jetted horizontally from one side at the bottom of the cathode. Alternatively, the electrolyte is jetted horizontally from both sides at the bottom of the cathode simultaneously.

Preferably, the electrolyte is jetted vertically upward in a flat shape parallel to the surface of the cathode from the bottom of the cathode, forming a fan-shaped liquid curtain wall close to the surface of the cathode.

Preferably, the current density is 400 to 600 A/m$^2$.

Preferably, a heat exchanger is provided between the delivery pump and the pressurization device.

It is provided a parallel jet electrolytic device, including:

a parallel jet device provided within an electrolytic tank and having multiple groups of nozzles provided thereon, in which each group of the nozzles point to a gap between a cathode and an anode and each group of the nozzles are parallel to one another and close to the side of the cathode, for jetting in parallel an electrolyte from the bottom near the surface of the cathode into a gap between the cathode and the anode; and a pumping device for delivering the electrolyte within a circulation tank of the electrolytic device to the parallel jet device, including a delivery pump and a pressurization device which are connected sequentially in the direction from the circulation tank to the parallel jet device.

Preferably, a first liquid output passage and a second liquid output passage are provided side by side on the nozzles, wherein the first liquid output passage in a flat shape is parallel to the surface of the cathode in its length direction and closer to the cathode relative to the second liquid output passage.

Preferably, the parallel jet device is provided on one side or two sides of the inner side wall of the electrolytic tank, with the nozzles horizontally pointing to the gap between the cathode and the anode.

Preferably, flat liquid output passages are provided on the nozzles.

Preferably, the parallel jet device is provided at the bottom of the electrolytic tank, with the nozzles pointing upward to the gap between the cathode and the anode.

As can be seen from the above technical solutions, in the parallel jet electrolytic process provided according to the invention, after the electrolyte is pressurized, it is jetted in parallel from a position at the bottom and near the surface of the cathode at a rate of 0.5 to 2.5 m/s into the gap between the cathode and the anode. The invention also provides a parallel jet electrolytic device including a parallel jet device and a pumping device, wherein the parallel jet device is provided within an electrolytic tank and has multiple groups of nozzles provided thereon, each group of the nozzles point to the gap between the cathode and the anode, and each group of the nozzles are parallel to one another and close to the side of the cathode, for jetting the electrolyte in parallel from the bottom close to the surface of the cathode into the gap between the cathode and the anode; and the pumping device is used for delivering the electrolyte within the circulation tank of the electrolytic device to the parallel jet device, including a delivery pump and a pressurization device which are connected sequentially in the direction from the circulation tank to the parallel jet device. With the parallel jet electrolytic process and the device described above, during the production process, the pressurized electrolyte is jetted in parallel from the position at the bottom and close to the surface of the cathode, thus the electrolyte flows along the surface of the cathode from bottom to top at the cathode side; meanwhile, at the anode side, as the metal ions have a relatively high concentration and a relatively large specific gravity, the old electrolyte has a trend to move downward, and thus under the impetus of the replenished new electrolyte with a relatively small specific gravity, the electrolyte moves from top to bottom along the surface of the anode, which thus achieves a side cutting function on the cathode and the anode, forming a forced inner circulation between the cathode and the anode, replenishing $Cu^{2+}$ at the cathode, accelerating the diffusion rate of $Cu^{2+}$ at the anode, and eliminating concentration polarization; and at the same time, the side cutting flow of the electrolyte from top to bottom at the anode is able to greatly increase the settling rate of the anode slime and avoid its adhesion to the anode to form an anode slime layer, thereby avoiding anode passivation.

DESCRIPTION OF THE DRAWINGS

To illustrate the examples of the invention or the technical solutions in the prior art more clearly, the drawings that are needed to describe the examples or the prior art are introduced briefly below; apparently, the drawings described below are only certain examples of the invention, and for those ordinary skilled in the art, other drawings may also be obtained according to these drawings on the premise of no creative work.

DETAILED DESCRIPTION OF THE INVENTION

The invention provides a parallel jet electrolytic process and a parallel jet electrolytic to achieve an object of eliminating concentration polarization and avoiding anode passivation phenomenon.

The technical solutions according to examples of the invention are described clearly and fully below with reference to the drawings in the examples of the invention. Apparently, the examples described are only part of the examples according to the invention, rather than all of examples. All the other examples obtained by those ordinary skilled in the art on the premise of no creative work, based on the examples according to the invention, fall within the scope claimed by the invention.

Figure 1:
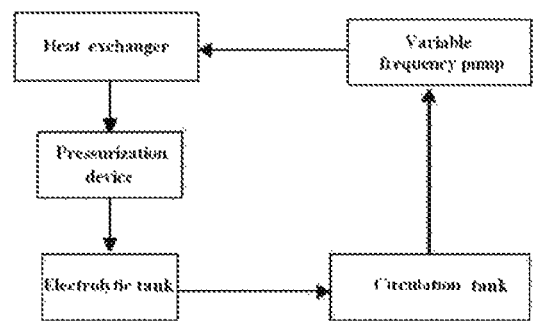
FIG. 1 is a flowchart of a parallel jet electrolytic process provided according to an example of the invention.

Referring to FIG. 1 and FIG. 1 is a flowchart of a parallel jet electrolytic process provided according to an example of the invention.

The invention provides a parallel jet electrolytic process, wherein an electrolyte after being pressurized is jetted in parallel from a position at the bottom and near a surface of a cathode at a rate of 0.5 m/s to 2.5 m/s into a gap between the cathode and an anode.

Compared with the prior art, in the parallel jet electrolytic process provided according to the invention, since the pressurized electrolyte is jetted in parallel from the bottom along the surface of the cathode plate, the electrolyte flows along the surface of the cathode from bottom to top at the cathode side; and at the same time, at the anode side, as the metal ions have a relatively high concentration and a relatively large specific gravity, the old electrolyte has a trend to move downward, and thus under the impetus of the replenished new electrolyte with a relatively small specific gravity, the electrolyte moves from top to bottom along the surface of the anode, which thus achieves a side cutting function on the cathode and the anode, forming a forced inner circulation between the cathode and the anode, replenishing $Cu^{2+}$ at the cathode, accelerating the diffusion rate of $Cu^{2+}$ at the anode, eliminating concentration polarization, thereby being able to improve productivity by increasing current density; and at the same time, the side cutting flow of the electrolyte from top to bottom at the anode is able to greatly increase the settling rate of the anode slime and avoid its adhesion to the anode to form an anode slime layer, thereby avoiding anode passivation.

Further, the electrolyte is delivered from a circulation tank to the pressurization device by a delivery pump and pressurized, and the electrolyte has a pressure of 0.5 to 1 Mpa.

The delivery pump may employ a variety of configurations. According to an example of the invention, the delivery pump is a variable frequency pump. By using the variable frequency pump, the operating parameters of the variable frequency pump may be adjusted according to the production requirements during the production process to achieve the object of controlling the flow rate of the electrolyte and allowing it to meet the production requirements.

The anode slime floating in the electrolyte tends to adhere mechanically to the surface of the cathode, which affects the quality of the electrolytic copper. To avoid occurrence of this phenomenon, according to an example of the invention, the electrolyte is jetted into the gap between the cathode and the anode as two flows, wherein the first flow is jelled in a flat shape parallel to the surface of the cathode, forming a fan-shaped liquid curtain wall close to the surface of the cathode; and the second flow is jetted from the side of the first flow that is far away from the cathode. The electrolyte flows from bottom to top along the surface of the cathode at the cathode side, and moves from top to bottom along a surface of the anode at the anode side simultaneously, forming an inner circulation. As can be seen, by dividing the jetted electrolyte into two flows, the first flow protects the cathode from contamination with the anode slime by allowing the new electrolyte to form a fan-shaped liquid curtain wall at the surface of the cathode, and at the same time, the second flow drives the electrolyte between the cathode and the anode to form an inner circulation, eliminating concentration polarization.

When the way of jetting described above is employed, the electrolyte is jetted horizontally from one side at the bottom of the cathode. Alternatively, the electrolyte is jetted horizontally from both sides at the bottom of the cathode simultaneously.

Naturally, the parallel jet electrolytic process may also employ other ways of jetting. In another example according to the invention, the electrolyte is jetted into the gap between the cathode and the anode as one flow; and the electrolyte is jetted in a flat shape parallel to the surface of the cathode, forming a fan-shaped liquid curtain wall close to the surface of the cathode. Further, when the way of jetting described above is employed, the electrolyte need to be jetted vertically upward from the bottom of the cathode.

The low current density is a main factor that limits the productivity of the electrolytic process in the prior art, but the parallel jet electrolytic process provided according to the invention is able to form a forced inner circulation between the cathode and the anode, facilitating the exchange and replenishment of $Cu^{2+}$ between the cathode and the anode. Therefore, the parallel jet electrolytic process provided according to the invention can increase the current density to 400 to 600 $A/m^2$, which is increased by 200% or more compared with the current density of 280 $A/m^2$ in the traditional process, thereby the productivity can be improved greatly.

Further, to save energy and reduce emissions, a heat exchanger is provided between the delivery pump and the pressurization device in an example of the invention.

The parallel jet electrolytic process provided according to the invention may process high-impurity anode plates having chemical constituents of Cu≥97%, Pb≤1%, As≤1%, Bi≤0.5%, and Ni≤0.5%. Compared with the traditional process, the impurity content of the anode copper that may be processed is 5-10 times higher, the current efficiency is up to 99.0% or more, the residue anode rate is as low as 13%, and the cathode copper grade is 99.9975% or more.

Figure 2:
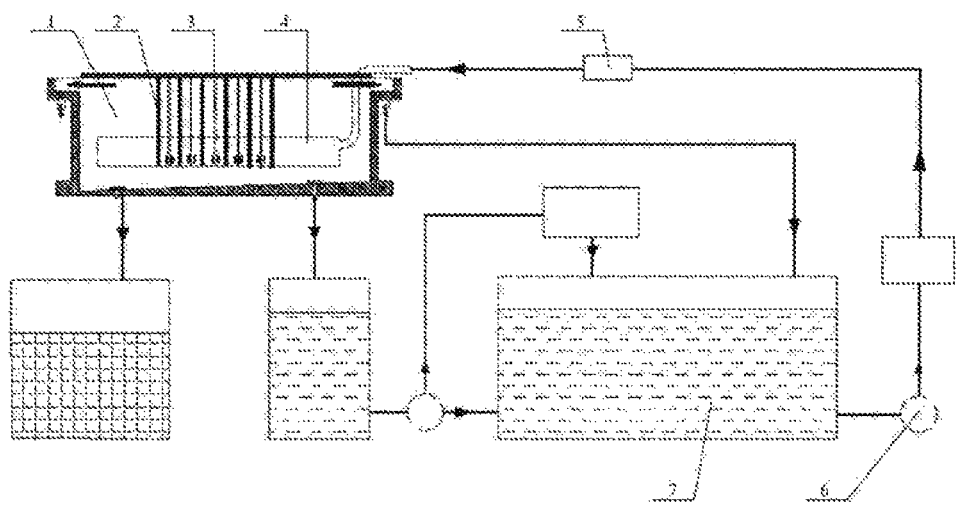
FIG. 2 is a structural representation of a parallel jet electrolytic device provided according to an example of the invention.
Figure 3:
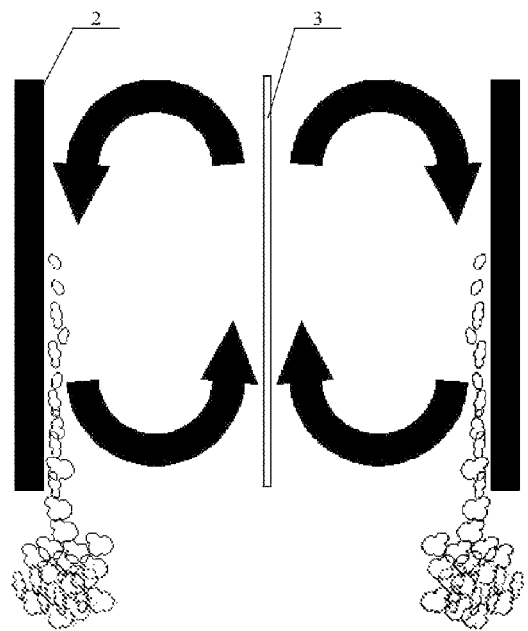
FIG. 3 is a motion trajectory diagram of an electrolyte between a cathode and an anode of a parallel jet electrolytic device provided according to an example of the invention.

Referring to FIGS. 2 and 3, FIG. 2 is a structural representation of a parallel jet electrolytic device provided according to an example of the invention, and FIG. 3 is a motion trajectory diagram of an electrolyte between a cathode and an anode of a parallel jet electrolytic device provided according to an example of the invention.

The invention also provides a parallel jet electrolytic device including a parallel jet device 4 and a pumping device.

Among others, the parallel jet device 4 is provided within an electrolytic tank 1 and has multiple groups of nozzles 41 provided thereon, wherein each group of the nozzles 41 point to a gap between the cathode 3 and the anode 2 and each group of the nozzles 41 are parallel to one another and close to the side of the cathode 3, for jetting in parallel the electrolyte from the bottom close to the surface of the cathode 3 plate into the gap between the cathode 3 and the anode 2; and the pumping device is used for delivering the electrolyte within a circulation tank 7 of the electrolytic device to the parallel jet device 4, and includes a delivery pump 6 and a pressurization device 5 which are connected sequentially in the direction from the circulation tank 7 to the parallel jet device 4.

Compared with the prior art, in the parallel jet electrolytic process provided according to the invention, during the production process, since the pressurized electrolyte is jetted in parallel from the bottom along the surface of the cathode 3 plate through the parallel jet device 4 after being pressurized in the pressurization device 5, the electrolyte flows from bottom to top along the cathode 3 surface at the cathode 3 side; and at the same time, at the anode 2 side, as the metal ions have a relatively high concentration and a relatively large specific gravity, the old electrolyte has a trend to move downward, and thus under the impetus of the replenished new electrolyte with a relatively small specific gravity, the electrolyte moves from top to bottom along the surface of the anode 2, which thus achieves a side cutting function on the cathode and the anode, forming a forced inner circulation between the cathode and the anode, replenishing $Cu^{2+}$ at the cathode 3, accelerating the diffusion rate of $Cu^{2+}$ at the anode 2, eliminating concentration polarization, thereby being able to improve productivity by increasing current density; and at the same time, the side cutting flow of the electrolyte from top to bottom at the anode 2 is able to greatly increase the settling rate of the anode slime and avoid its adhesion to the anode 2 to form an anode slime layer, thereby avoiding anode 2 passivation.

Figure 4:
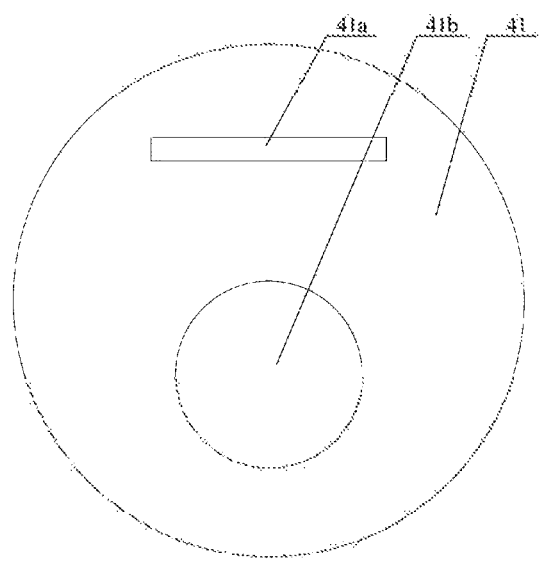
FIG. 4 is a structural representation of a nozzle of a parallel jet electrolytic device provided according to an example of the invention.

In recent years, with the global mining of concentrates, the stock of rich concentrates is gradually decreasing, the grade of the concentrates fed in the smelters of each country decreases, and the content of impurities such as Pb, As, Sb, Bi, Ni and the like in the produced anode 2 rises greatly; among others, the anode slime formed by the impurities such as As, Sb, Bi and the like due to their small specific gravity will form floating anode slime which is suspended in the electrolyte and very easy to adhere mechanically to the surface of the cathode 3, affecting the quality of the electrolyzed copper. Therefore, to avoid the adhesion of the floating anode slime to the cathode 3, in an example according to the invention, referring to FIG. 4 which is a structural representation of a nozzle of the parallel jet electrolytic device provided according to an example of the invention, a first liquid output passage 41a and a second liquid output passage 41b are provided side by side on the nozzle 41, in which the first liquid output passage 41a in a flat shape is parallel to the surface of the cathode 3 in its length direction and closer to the cathode 3 relative to the second liquid output passage 41b, and the electrolyte will form a fan-shaped liquid curtain wall when being jetted through the flat first liquid output passage 41a into between the cathode and the anode, which is able to effectively prevent the floating anode slime from reaching the cathode 3, avoid the adhesion of the floating anode slime to the cathode 3, and improving the quality of the electrolytic copper. In addition, the electrolyte jetted through the second liquid output passage 41b into between the cathode and the anode can drive the electrolyte at the cathode 3 side to flow from bottom to top along the cathode 3 surface and to move from top to bottom along the surface of the anode 2 at the anode 2 side simultaneously, forming an inner circulation. As can be seen from above, the electrolyte jetted from the above nozzle 41 is able to not only drive the inner circulation between the cathode and the anode, which increases the circulation volume and eliminates concentration polarization, but also form a liquid curtain wall, which prevents the floating anode slime from being adhered to the cathode 3 and improves the quality of the electrolytic copper.

Further, in an example of the invention, the first liquid output passage 41a has a rectangular or elliptical cross section, and the second liquid output passage 41b has a circular or elliptical cross section. Naturally, the first liquid output passage 41a may also employ other shapes, as long as its flat shape can be ensured to form a fan-shaped liquid curtain wall.

Figure 5:
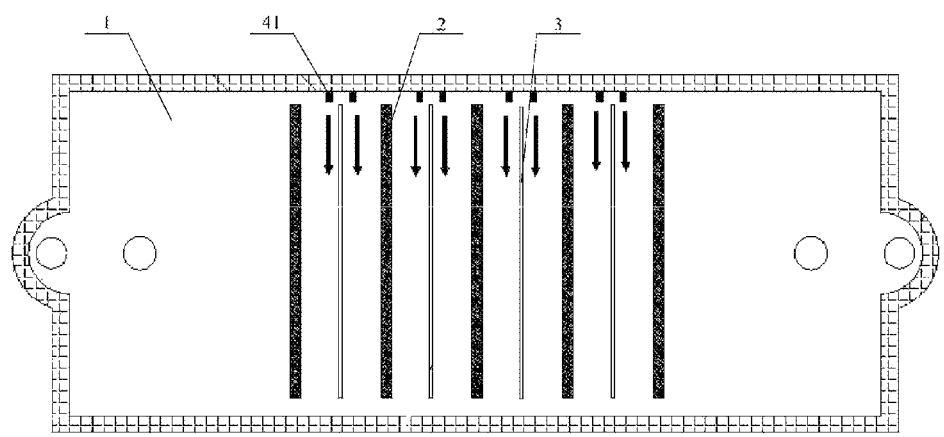
FIG. 5 is a top view of an electrolytic tank of a parallel jet electrolytic device provided according to an example of the invention.
Figure 6:
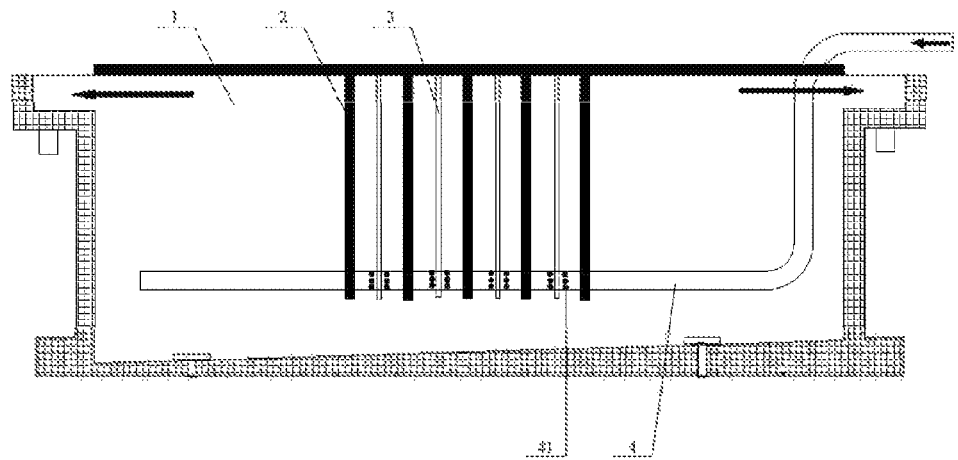
FIG. 6 is a front view of an electrolytic tank of a parallel jet electrolytic device provided according to an example of the invention.
Figure 7:
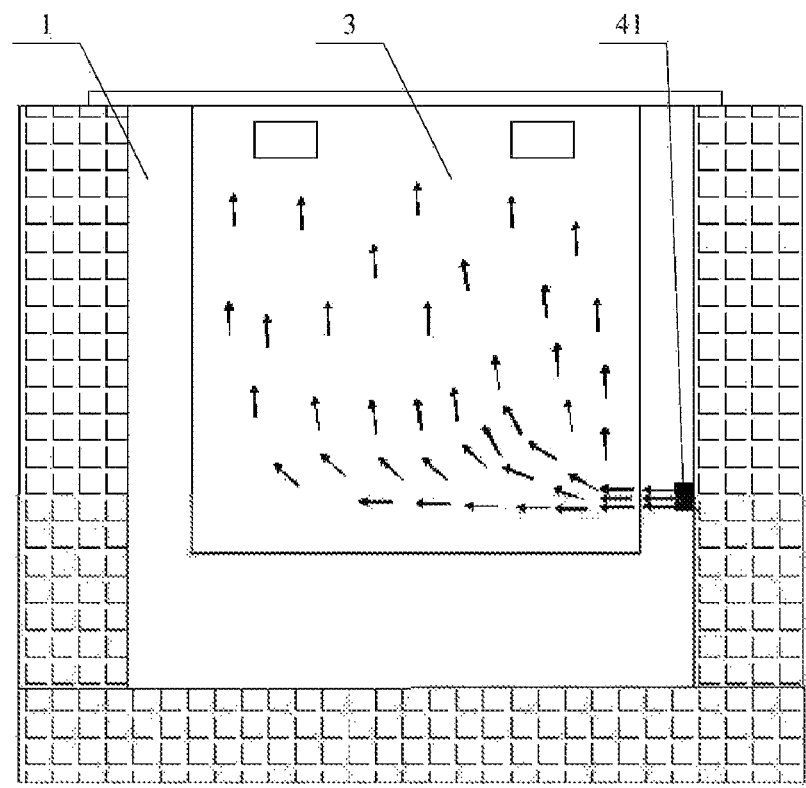
FIG. 7 is a side view of an electrolytic tank of a parallel jet electrolytic device provided according to an example of the invention.

Referring to FIGS. 5 to 7, FIG. 5 is a top view of an electrolytic tank of the parallel jet electrolytic device provided according to an example of the invention; FIG. 6 is a front view of an electrolytic tank of the parallel jet electrolytic device provided according to an example of the invention; and FIG. 7 is a side view of an electrolytic tank of the parallel jet electrolytic device provided according to an example of the invention. When the nozzle 41 as described above is employed, the parallel jet device 4 employing a side in and top out way of circulation is provided on one side or two sides of the inner side wall of the electrolytic tank 1, with the nozzle 41 pointing horizontally to the gap between the cathode 3 and the anode 2. In this way, the electrolyte is jetted from the side of the cathode 3 plate at the bottom in a horizontal direction, rises between the cathode plate and the anode plate along the cathode 3, and descends along the surface of the anode 2 plate, forming an inner circulation. Feeding the solution from both sides can ensure a good effect of the inner circulation in case of wide cathode and anode. Preferably, the vertical distance between the nozzle 41 and the bottom of the cathode 3 is not less than 10 cm.

Figure 8:
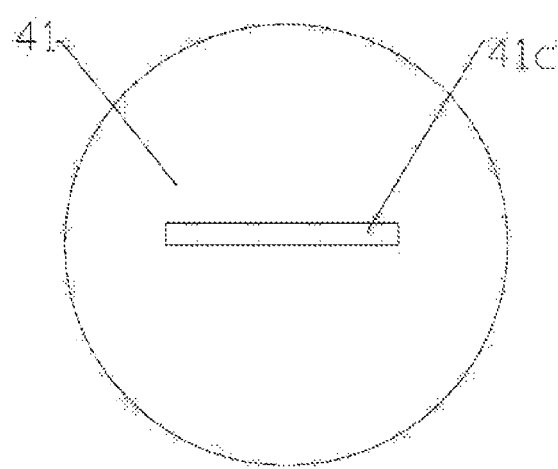
FIG. 8 is a structural representation of a nozzle of a parallel jet electrolytic device provided according to another example of the invention.

Naturally, the nozzle 41 may also employ other constructions, for example, in another example according to the invention, referring to FIG. 8, which is a structural representation of a nozzle of the parallel jet electrolytic device provided according to another example of the invention, only one flat liquid output passage 41c is provided on the nozzle 41.

Figure 9:
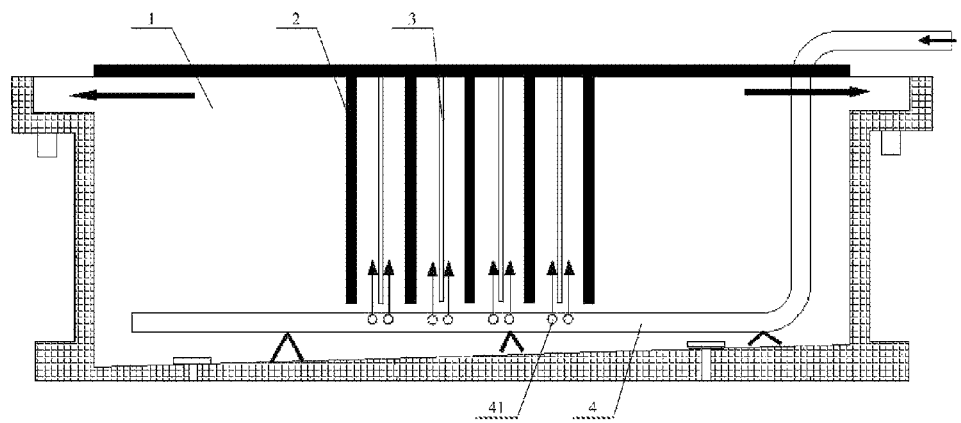
FIG. 9 is a front view of an electrolytic tank of a parallel jet electrolytic device provided according to another example of the invention.
Figure 10:
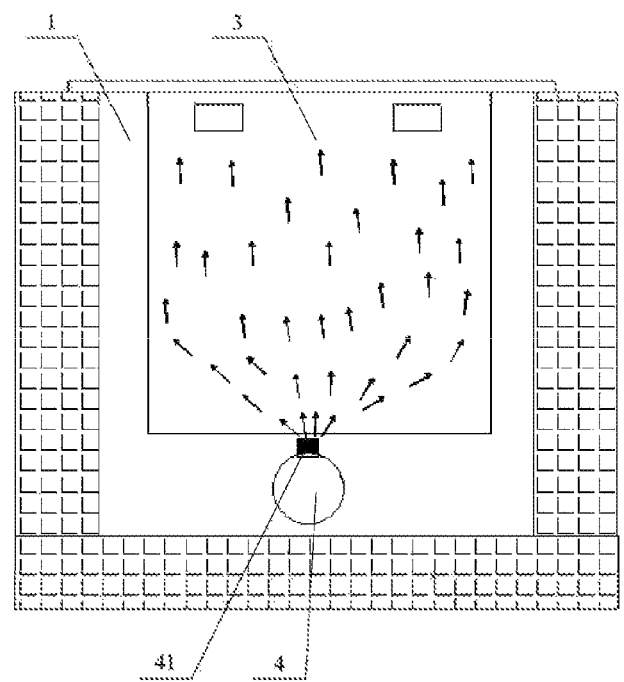
FIG. 10 is a side view of an electrolytic tank of a parallel jet electrolytic device provided according to another example of the invention.

When the nozzles 41 having only one liquid output passage 41c described above is employed, since they can only jet the electrolyte in a fan shape, in order to enable an inner circulation between the cathode and the anode, the parallel jet electrolytic device provided according to the invention cannot employ the side in and top out way of circulation, but need to be modified by employing a bottom in and top out way of circulation instead, that is, the parallel jet device 4 is provided at the bottom of the electrolytic tank 1. Referring to FIGS. 9 and 10, FIG. 9 is a front view of an electrolytic tank of the parallel jet electrolytic device provided according to another example of the invention, and FIG. 10 is a side view of an electrolytic tank of the parallel jet electrolytic device provided according to another example of the invention; in this way of circulation, the nozzles 41 point upward to the gap between the cathode 3 and the anode 2, and the electrolyte is jetted through the nozzles 41 from bottom to top into the gap between the cathode and the anode by being close to the plate surface of the cathode 3 plate.

According to an example of the invention, to simplify the construction for easy manufacture, the parallel jet device 4 includes liquid feeding pipes and the nozzles 41 provided on the liquid feeding pipes; and at the same time, for easy replacement of the nozzles 41, between the nozzle 41 and the liquid feeding pipe is threaded connection. The nozzles 41 may be manufactured from various materials, such as PVC material, stainless steel and the like.

To ensure the formation of the inner circulation and the liquid curtain wall, the electrolyte has to be jetted at a high rate. Therefore, in an example of the invention, the pumping device includes the pressurization device 5, in addition to the delivery pump 6, to increase the pressure of the electrolyte, to increase its flow rate and to obtain high-speed jets. The pressurization device 5 may employ various constructions such as orifice plate or booster pump, to accomplish pressurization to the electrolyte.

To enable the flow rate of the electrolyte to be adjusted at any time according to the production requirements, in an example of the invention, the delivery pump 6 is a variable frequency pump, and through the cooperation between the variable frequency pump and the pressurization device 5, the electrolyte can flow into the electrolytic tank 1 at a rate of 0.5 to 2.5 m/s, which ensures the formation of the inner circulation and the liquid curtain wall.

Each example in the present specification is described in a progressive way; all that each example highlights are the differences from other examples, and the same or similar pails among respective example may refer to each other.

The above descriptions of the disclosed examples can allow those skilled in the art to implement or use the invention. Various modifications to these examples are apparent to those skilled in the art, and the general principle defined herein may be implemented in other examples without departing from the spirit or scope of the invention. Therefore, the invention shall not be limited to these examples illustrated herein, but corresponds to the broadest scope consistent with the principle and novel features disclosed herein.

The invention claimed is:

1. A parallel jet electrolytic process, wherein an electrolyte after being pressurized is jetted in parallel from a position at the bottom and near a surface of a cathode at a rate of 0.5 to 2.5 m/s into a gap between the cathode and an anode, wherein the electrolyte is jetted into the gap between the cathode and the anode as two flows, in which the first flow is jetted in a flat shape parallel to the surface of the cathode, forming a fan-shaped liquid curtain wall close to the surface of the cathode; the second flow is jetted from the side of the first flow that is away from the cathode; and the electrolyte flows from bottom to top along the surface of the cathode at the cathode side, and moves from top to bottom along a surface of the anode at the anode side simultaneously, forming an inner circulation.

2. The parallel jet electrolytic process according to claim 1, wherein the electrolyte is delivered to a pressurization device by a delivery pump and pressurized, and the electrolyte has a pressure of 0.5 to 1 MPa.

3. The parallel jet electrolytic process according to claim 1, wherein the electrolyte is jetted horizontally from one side at the bottom of the cathode; alternatively, the electrolyte is jetted horizontally from both sides at the bottom of the cathode simultaneously.

4. The parallel jet electrolytic process according to claim 1, wherein the electrolyte is jetted vertically upward in a flat shape parallel to the surface of the cathode from the bottom of the cathode, forming the fan-shaped liquid curtain wall close to the surface of the cathode.

5. The parallel jet electrolytic process according to claim 1, wherein a current density is 400 to 600 $A/m^2$.

6. The parallel jet electrolytic process according to claim 2, wherein a heat exchanger is provided between the delivery pump and the pressurization device.

* * * * *